Sept. 19, 1933.  C. H. MORROW  1,927,669
GAS PRESSURE REGULATOR
Filed March 8, 1932
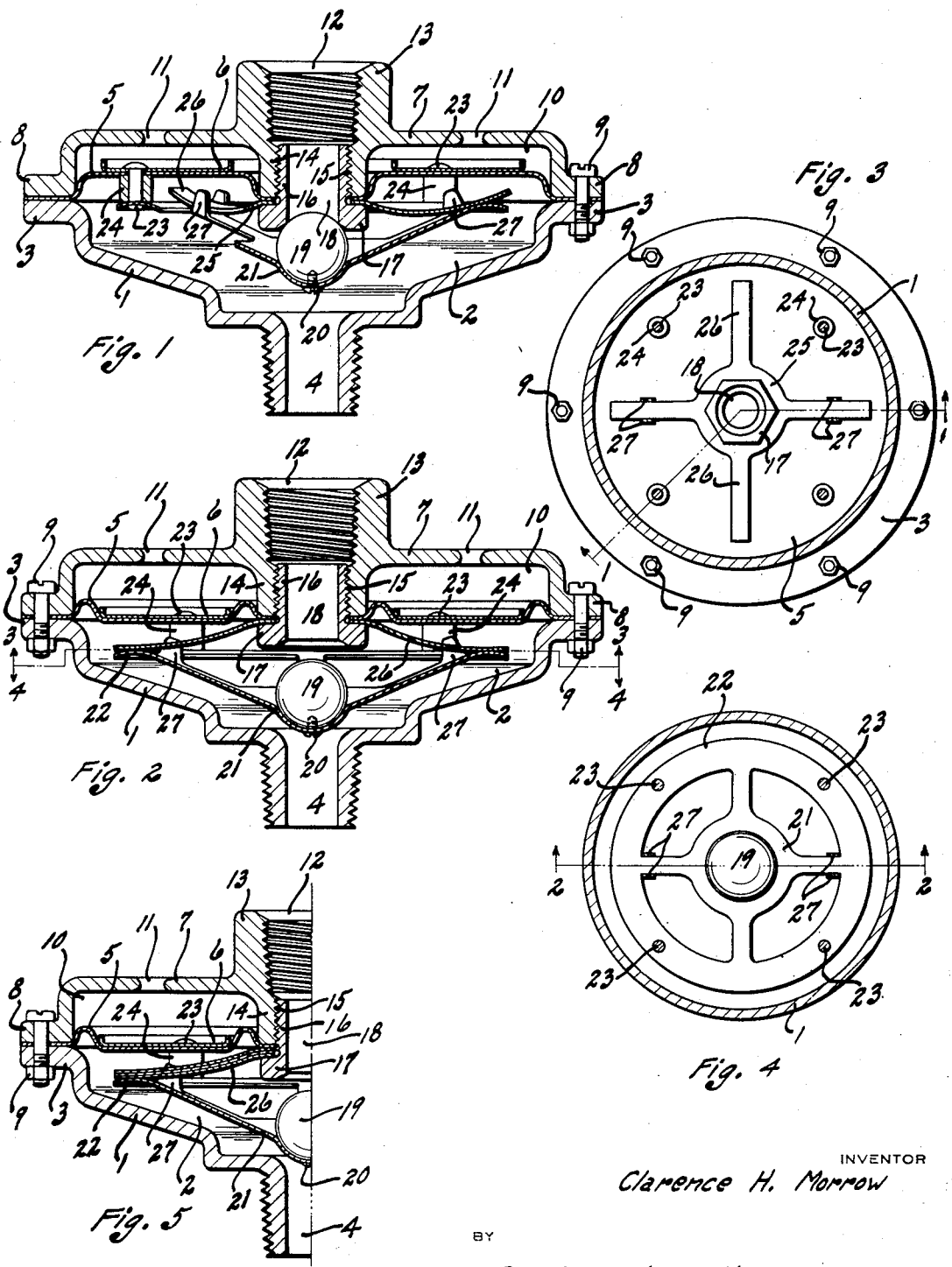
INVENTOR
Clarence H. Morrow
BY
Brockett, Hyde, Higley & Meyer
ATTORNEYS Patented Sept. 19, 1933

1,927,669

UNITED STATES PATENT OFFICE 1,927,669

GAS PRESSURE REGULATOR

Clarence H. Morrow, Cleveland, Ohio, assignor to The Hotstream Heater Company, Cleveland, Ohio, a corporation of Ohio Application March 8, 1932. Serial No. 597,506

3 Claims. (Cl. 50—23)

This invention relates to pressure regulators such as one for insertion between a gas burner and its source of gas supply, for maintaining gas pressure at the burner substantially independent of fluctuations in pressure at the source.

Devices for the purpose are not new in the art, but the object of the present invention is to provide a novel construction for such a regulator, of comparative simplicity, small size, and correspondingly inexpensive to manufacture.

Another object is to provide a novel spring arrangement whereby adjustment of the regulator to meet varying conditions is had merely by the employment of a greater or smaller number of similar springs.

The exact nature of this invention together with further objects and advantages thereof will be apparent from the following description taken in connection with the accompanying drawing, in which Figs. 1 and 2 are views in longitudinal section showing an embodiment of the invention with its parts in different positions; Figs. 3 and 4 are transverse sections to reduced scale in the plane of line 3—4, Fig. 2, Fig. 3 as looking upwards and Fig. 4 as looking downwards; the section of Fig. 1 being as in the line 1—1, Fig. 3, and the section of Fig. 2 being as in the line 2—2, Fig. 4, and Fig. 5 is a sectional detail corresponding to Fig. 2 but illustrating the employment of a plurality of springs.

With reference now to the drawing, 1 is a housing member recessed as indicated to provide a cavity 2, with a flange 3 about the mouth thereof. The housing member is preferably symmetrical about an axis as indicated in the drawing, and has a central opening 4 bearing external threads to provide an outlet connection for the cavity 2.

A diaphragm 5 is arranged to overlie the flange 3 of the housing member 1, and being of flexible material such as leather, is preferably provided with a metallic backing 6. The diaphragm 5 has a central opening as will appear.

A closure member 7 is provided, having a flange 8 cooperative with the flange 3 of the housing member 1 to secure the diaphragm at its periphery through the employment of bolts 9. The closure member 7 is recessed as indicated at 10 to allow free motion to the diaphragm means, and is apertured as at 11 to expose the back of the diaphragm means to free communication with the atmosphere. The closure member has a central through opening 12 with an external projection 13 thereabout internally threaded as indicated to provide an inlet opening, and a corresponding internal projection 14 leading substantially to the plane of the periphery of the diaphragm means. The central opening of the diaphragm means is of such size that the diaphragm overlies the projection 14, which is interiorly threaded as at 15 to receive a nipple 16. This nipple is flanged as at 17 so that it may be turned into the threads 15 to grip and seal the diaphragm about the central opening of the latter as shown.

Valve means are arranged in the cavity 2 and carried by the diaphragm means to control the opening 18 in the nipple 16.

Of the valve means, the valve per se, 19, which may be of the ball form indicated, is secured by a screw 20 in a corresponding socket in a carrier 21. This carrier is formed generally like a dished wheel as indicated Fig. 4, with an annular periphery 22. This periphery is secured with the diaphragm means as by rivets 23 located between the spokes of the wheel and extending through spacers 24 by which the periphery 22 of the carrier 21 is maintained in rigidly spaced relation with the diaphragm means. As shown, the rivets 23 also serve to secure the diaphragm backing 6.

Although the flexure of the diaphragm means may be sufficient to allow the valve means to assume the position shown Fig. 1, spring means are provided for yieldably urging the valve means from this position. Such spring means may be in spider form having a central body 25 and arms 26. The body 25 is perforated to be secured by the flange 17 of the nipple 16 in the same manner that the diaphragm is secured thereby, and the arms 26 are of sufficient length to extend outwardly of the nipple and overlie the peripheral part 22 of the valve carrier 21 between the rivets 23. The arms 26 are bent from the plane of the body part 25 of the spider to yieldably urge the parts to the position of Fig. 2. Preferably the spider arms are the same in number as the spoke parts of the valve carrier and are maintained indexed overlying the latter by pairs of integral ears 27 upstanding from the valve carrier.

Operation will be apparent. The parts being yieldably maintained in the position shown Fig. 2, when the gas or other fluid to be controlled is admitted through the inlet opening 12 under pressure, if the pressure be insufficient to overcome the spring means, the fluid will have substantially unobstructed passage through the regulator and out the outlet 4 thereof. As the inlet pressure is increased, however, this pressure acts against the diaphragm means to move the latter against the action of the spring means, toward the position of Fig. 1. As the valve means approaches the nipple, the outlet opening in the latter is obstructed. The more the obstruction, the less will be the flow and the less pressure therefore exerted against the diaphragm means. Consequently with any given inlet pressure the valve means will automatically assume a position of balance where flow is properly restricted through the regulator, and the outlet pressure of the latter will, therefore, be maintained substantially constant regardless of inlet pressure. The position of the valve means shown in Fig. 1 is, of course, one approached but never actually obtained in service.

Where higher inlet pressures are to be met, a number of similar spring means may be employed in stacked relation, all secured together by the nipple 16 as indicated Fig. 5. In any event it will be observed that the arms 26 act as leaf springs, as single leaf springs where a single spider is employed as in Figs. 1-4, and as multiple leaf springs where a plurality of spiders are employed as in Fig. 5.

What I claim is:

1. In a pressure regulator of the class described, a housing member recessed to provide a cavity and having an outlet opening leading therefrom, diaphragm means overlying the mouth of said cavity and having an opening, a closure member overlying said diaphragm means and secured with said housing member about the mouth of said cavity to secure said diaphragm about the periphery of the latter, said closure member being apertured to expose the back of said diaphragm means to free communication with the atmosphere, and having an inlet opening leading to that of said diaphragm means, a nipple arranged in said closure member opening and having a flange to secure said diaphragm means about the opening of the latter, valve means in said cavity carried by said diaphragm means to control the opening in said nipple, and spring means secured by said nipple flange and arranged to yieldably urge said valve means from said nipple.

2. In a pressure regulator of the class described, a housing member recessed to provide a cavity and having an outlet opening leading therefrom, diaphragm means overlying the mouth of said cavity and having an opening, a closure member overlying said diaphragm means and secured with said housing member about the mouth of said cavity to secure said diaphragm about the periphery of the latter, said closure member being apertured to expose the back of said diaphragm means to free communication with the atmosphere, and having an inlet opening leading to that of said diaphragm means, a nipple arranged in the opening of said diaphragm and turned into said closure member inlet opening, and flanged to secure said diaphragm means against said closure member, valve means in said cavity carried by said diaphragm means to control the opening in said nipple, and a plurality of similar spring means in stacked relation secured by said nipple flange and arranged to yieldably urge said valve means from said nipple.

3. In a pressure regulator of the class described, a housing member recessed to provide a cavity and having an outlet opening leading therefrom, diaphragm means overlying the mouth of said cavity and having an opening, a closure member overlying said diaphragm means and secured with said housing member about the mouth of said cavity to secure said diaphragm about the periphery of the latter, said closure member being apertured to expose the back of said diaphragm means to free communication with the atmosphere, and having an inlet opening leading to that of said diaphragm means, a nipple arranged in said closure member opening and having a flange to secure said diaphragm means about the opening of the latter, valve means in said cavity carried by said diaphragm means to control the opening in said nipple, and spring means secured by said nipple flange and arranged to yieldably urge said valve means from said nipple, said valve means including a wheel member peripherally secured with said diaphragm means, and said spring means including a spider member with arms bearing upon the peripheral part of said wheel member.

CLARENCE H. MORROW.